(12) United States Patent
Shved et al.

(10) Patent No.: US 10,556,515 B2
(45) Date of Patent: Feb. 11, 2020

(54) ELECTRICITY SUPPLY SYSTEM FOR TRANSPORT VEHICLE

(71) Applicant: LIMITED LIABILITY COMPANY "SMARTER", Chelyabinsk (RU)

(72) Inventors: Andrej Aleksandrovich Shved, Chelyabinsk (RU); Andrej Veniaminovich Velin, Chelyabinsk (RU)

(73) Assignee: LIMITED LIABILITY COMPANY "SMARTER", Chelyabinsk (RU)

( * ) Notice: Subject to any disclaimer, the term of this patent is extended or adjusted under 35 U.S.C. 154(b) by 30 days.

(21) Appl. No.: 15/574,152

(22) PCT Filed: Apr. 26, 2016

(86) PCT No.: PCT/RU2016/000242
§ 371 (c)(1),
(2) Date: Nov. 14, 2017

(87) PCT Pub. No.: WO2017/007369
PCT Pub. Date: Jan. 12, 2017

(65) Prior Publication Data
US 2018/0126870 A1     May 10, 2018

(30) Foreign Application Priority Data
Jul. 6, 2015  (RU) ................ 2015127182

(51) Int. Cl.
*H02J 1/04* (2006.01)
*B60L 15/20* (2006.01)
(Continued)

(52) U.S. Cl.
CPC .......... *B60L 15/2072* (2013.01); *B60L 50/51* (2019.02); *B60L 50/52* (2019.02); *B60R 16/03* (2013.01);
(Continued)

(58) Field of Classification Search
USPC ...... 318/432; 363/35, 51, 96, 127, 128, 131, 363/135
See application file for complete search history.

(56) References Cited

U.S. PATENT DOCUMENTS

| 4,563,732 A | 1/1986 | Ljungqvist et al. |
| 6,830,650 B2 * | 12/2004 | Roche ............... H01J 37/32935 118/712 |
| 2015/0380929 A1 * | 12/2015 | Mitsutani ................ B60L 58/20 307/52 |

FOREIGN PATENT DOCUMENTS

| RU | 2314215 C2 | 8/2008 | |
| RU | 2513025 C2 * | 4/2014 | ................ H02J 1/00 |

(Continued)

*Primary Examiner* — Eduardo Colon Santana
*Assistant Examiner* — Zemenay T Truneh
(74) *Attorney, Agent, or Firm* — John Alumit

(57) ABSTRACT

The invention relates to the field of electrical engineering. An electricity supply system for a transport vehicle contains an electric network (1) with negative and positive wires, to which are connected an accumulator battery (2) and an electric starter (3); a capacitor bank (4); a bidirectional converter (5), which is connected between the capacitor bank and the electric network; a regulator (6); and a temperature sensor (11). Voltage from the capacitor bank is fed to an input (10) of the regulator, an additional input (12) of the regulator is connected to the temperature sensor, and outputs of the regulator are connected to control inputs (7, 8, 9) of the bidirectional converter, which bidirectional converter, in accordance with a signal at the control inputs, is capable of changing the parameters of its own volt-ampere characteristics at the outputs on the side of the electric network. The regulator is carried out in a way that the maximum current flowing from the bidirectional converter to the electric network is a decreasing function of the temperature-sensor temperature. The invention extends the (Continued)

Figure 1:
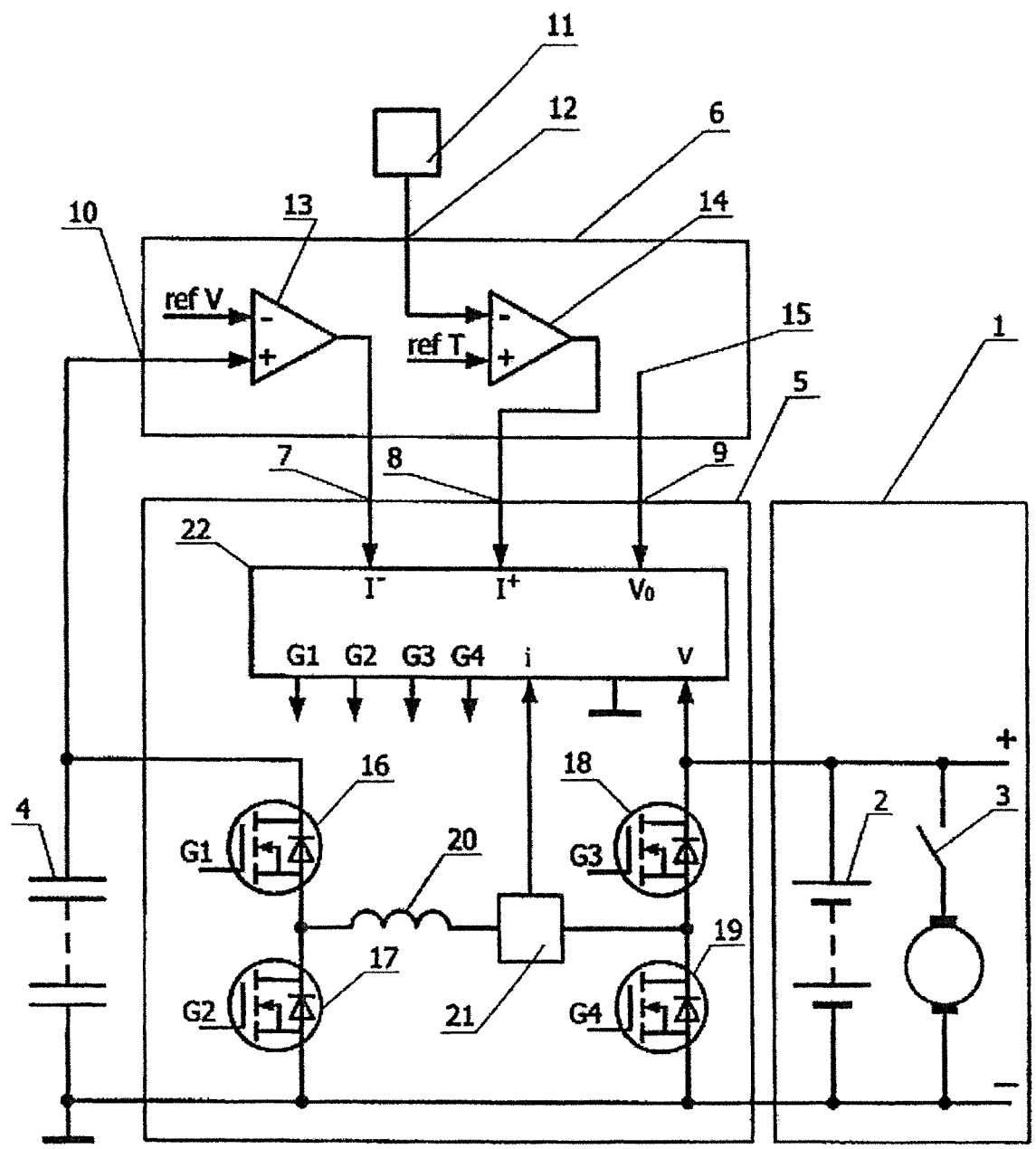

service life of an electric starter and enhances the reliability of an electricity supply system.

4 Claims, 2 Drawing Sheets

(51) Int. Cl.
| | |
|---|---|
| *B60R 16/03* | (2006.01) |
| *B60L 50/52* | (2019.01) |
| *F02N 11/10* | (2006.01) |
| *F02N 11/08* | (2006.01) |
| *B60L 50/51* | (2019.01) |
| *H02H 7/10* | (2006.01) |
| *H02J 3/36* | (2006.01) |
| *H02M 7/757* | (2006.01) |
| *H05H 1/00* | (2006.01) |
| *H02M 1/32* | (2007.01) |

(52) U.S. Cl.
CPC ............ *F02N 11/087* (2013.01); *F02N 11/10* (2013.01); *H02H 7/10* (2013.01); *H02J 3/36* (2013.01); *H02M 7/7575* (2013.01); *F02N 11/0814* (2013.01); *F02N 11/0866* (2013.01); *F02N 2011/0885* (2013.01); *F02N 2011/0888* (2013.01); *F02N 2200/063* (2013.01); *F02N 2200/064* (2013.01); *F02N 2300/106* (2013.01); *H02M 2001/327* (2013.01); *Y02T 10/7258* (2013.01)

(56) References Cited

FOREIGN PATENT DOCUMENTS

| | | | |
|---|---|---|---|
| RU | 2513025 | C2 | 4/2014 |
| SU | 864421 | A1 * | 9/1981 |
| SU | 864421 | A1 | 9/1981 |

* cited by examiner

ELECTRICITY SUPPLY SYSTEM FOR TRANSPORT VEHICLE

CROSS-REFERENCE TO RELATED APPLICATION

This application is a national stage patent application arising from PCT/RU2016/000242 filed on Apr. 26, 2016, and referenced in WIPO Publication No. WO/2017/007369. The earliest priority date claimed is Jul. 6, 2015.

FEDERALLY SPONSORED RESEARCH

None

SEQUENCE LISTING OR PROGRAM

None

DESCRIPTION

The invention is related to electrical equipment field, namely, to the electricity supply systems for transport vehicle.

Known is an electricity supply system, consisting of a converter, designed with semiconductor rectifiers, containing a regulating system and overheating sensor, connected to the regulating system to ensure the converter current is reduced when a certain temperature is reached (Copyright certificate RF No 864421, incl. H02H7/10, H02M1/18. Converter thermal protection device. Publ. Sep. 15, 1981).

A deficiency of this solution is that the load current depends on temperature. Thus, its functional capabilities are narrow.

Also known is an electricity supply system, consisting of an engine start module, containing a capacitor bank and a converter, whose input is connected to an accumulator battery, and the output is connected to the capacitor bank, connected to the electric starter power supply circuit (Maxwell Technologies, Inc. Ultra-capacitor Engine Start Module ESM. http://www.maxwell.com/esm/).

A deficiency of this system is a dynamic overload, which occurs when the electric starter switches on, which leads to a faster deterioration of a commutator-and-brush assembly, as well as of an electric starter drive.

There is a known electricity supply system consisting of an accumulator battery and a smooth start device, whose power input is connected to the accumulator battery, while the power output is connected to the electric starter power supply circuit (Russian Federation invention patent No 2447314, incl. F02N11/08, F02N11/14, B60W10/06. Electric starter system. Publ. Apr. 10, 2012).

This system, in comparison with previous similar ones, may not have a dynamic overload of the electric starter, however, it is bigger and heavier, since:

within the smooth start device, a full power commutation occurs, which is required to supply the electric starter, which leads to significant energy losses and requires a corresponding heat dissipation;

an internal resistance of the accumulator battery increases 2-3 times when temperature is reduced, in comparison with normal climatic conditions, which should be compensated by a corresponding increase in the size of the accumulator battery.

As a prototype, a closest electricity supply system to significant features of the claimed technical solution was chosen consisting of an electric network with negative and positive wires, to which an accumulator battery and electric starter are connected, capacitor bank, bidirectional converter, connected between the capacitor bank and electric network, regulator with at least one output and input, receiving a capacitor bank voltage, while the bidirectional converter has a control input, connected to the regulator's output, and designed to change its voltage-current characteristics at the outputs on the side of the electric network according to a signal from the control input (Russian Federation invention patent No 2513025, incl. H02J1/00. Electric power supply system. Publ. Apr. 20, 2014).

In comparison to previous similar ones, the prototype allows to reduce the current of the accumulator battery and reduce its size, since a partial load current flows from the capacitor bank through the bidirectional converter into electric network. The deficiencies of this prototype become evident at higher ambient temperature:

a dynamic overload of the electric starter occurs due to a reduction in internal resistance of the accumulator battery and due to a corresponding increase in the starting current;

increases the probability of the capacitor bank and bidirectional converter failure due to overheating.

The challenges of the claimed invention are an increase in the electric starter operational life and an increase in the electricity supply system reliability, which would expand its functional capabilities, particularly, would ensure an operability in the Start-Stop mode (with short intervals between electric starter actuation).

Technical results, which enable to solve this challenge, are:

a reduction in dependence of the electric starter in-rush current on temperature, which prevents the electric starter dynamic overload;

a prevention of the capacitor bank and bidirectional converter overheating.

This challenge is solved in the electricity supply system consists of an electric network with negative and positive wires, to which an accumulator battery and electric starter are connected, capacitor bank, bidirectional converter, connected between the capacitor bank and electric network, regulator with at least one output and an input with capacitor bank voltage supplied to it, while the bidirectional converter has at least one control input, connected to the output of the regulator, the bidirectional converter is designed to change its voltage-current characteristics at outputs on the side of the electric network, when a signal is transmitted from the control input, by implementing, according to the invention design, a thermal sensor, the regulator is equipped with an additional input, connected to the thermal sensor, and designed so that the maximum value of current, flowing from the bidirectional converter into the electric network, is a decreasing function of the thermal sensor temperature.

The bidirectional converter may have the following parameters of voltage-current characteristics at outputs on the side of the electric network: current regulation part $i(v)=I-$ at voltage values $v>V0$, current regulation part $i(v)=I+$ at voltage values $v<V0$, voltage regulation part $v(i)=V0$ at current values $I-<I<I+$; where the bidirectional converter may have first, second and third control inputs to set parameters $I-$, $I+$ and $V0$ respectively.

The regulator may contain: first error detector, whose output is connected to the first control input of the bidirectional converter, while a direct input is a regulator input; second error detector, whose output is connected to the second control input of the bidirectional converter, while an inversing input is an additional regulator input; source of the voltage reference, supplied to a third control input of the bidirectional converter.

The bidirectional converter may contain: four keys, based on insulated-gate field-effect transistors; inductor with a inductor's current sensor; key control circuit, whose first, second and third inputs correspond with control inputs of the bidirectional converter, the fourth input is connected to the inductor's current sensor output, and the fifth input receives the electric network voltage. In this case, the negative output of the capacitor bank is connected with the negative wire of the electric network, the positive and negative outputs of the capacitor bank are interconnected by serially connected first and second keys, the positive and negative wires of the electric network are interconnected by serially connected third and fourth keys, the connecting point of the first and second keys is linked through the inductor and the inductor's current sensor to the connecting point of the third and fourth keys.

The bidirectional converter may have a digital control input. In this case, the regulator is designed as a microprocessor device.

The capacitor bank, bidirectional converter, regulator and thermal sensor may be placed in the common housing, installed near the accumulator battery.

To manufacture the claimed system, known material and standard equipment are required. Thus, it corresponds to the "industrial applicability" criterion.

Performed research of patent and technical scientific information sources shows evidence that the claimed electric power supply system is unknown to the current technical level and corresponds to the "innovation" criterion.

From the current technical level, solutions were discovered, having features, matching the distinguished features of the claimed system: the regulator and thermal sensor are designed to have a reduction in the converter current when the temperature rises.

There is a known effect of mentioned distinguishing features on the prevention of overheating, which is achieved by reducing the current load and the corresponding narrowing of the system's functional capabilities.

An effect of mentioned distinguishing features on the reduction of the electric starter in-rush current depending on the temperature was not confirmed. Furthermore, contrary to known solutions, the electric starter load current stabilizes and the system's functional capabilities are widened.

Thus, the proposed solution corresponds to the "invention level" criterion, since it contains a known system, supplemented by a known component, but which provides a total technical result, which is ensured by an interconnection of known components and is not taken from the current technical level.

Significant features of the proposed solution affect the achievement of the technical result in the following way:

implementing a bidirectional converter between the capacitor bank and electric network allows to utilize the total current of the capacitor bank and accumulator battery to power the electric starter;

an ability to change voltage-current characteristics of the bidirectional converter at the outputs on the side of the electric network according to a signal from the regulator, which allows to control the capacitor bank current;

a connection of a thermal sensor to the regulator and designing the regulator so the maximum value of current, flowing from the bidirectional converter into electric network, is a decreasing function of the thermal sensor temperature, which compensates for the temperature dependence of the accumulator battery current due to the corresponding change of the capacitor bank current. Thus, the temperature dependence of the in-rush current of the electric starter is reduced. At the same time, overheating of the capacitor bank and bidirectional converter are prevented.

Figure 2:
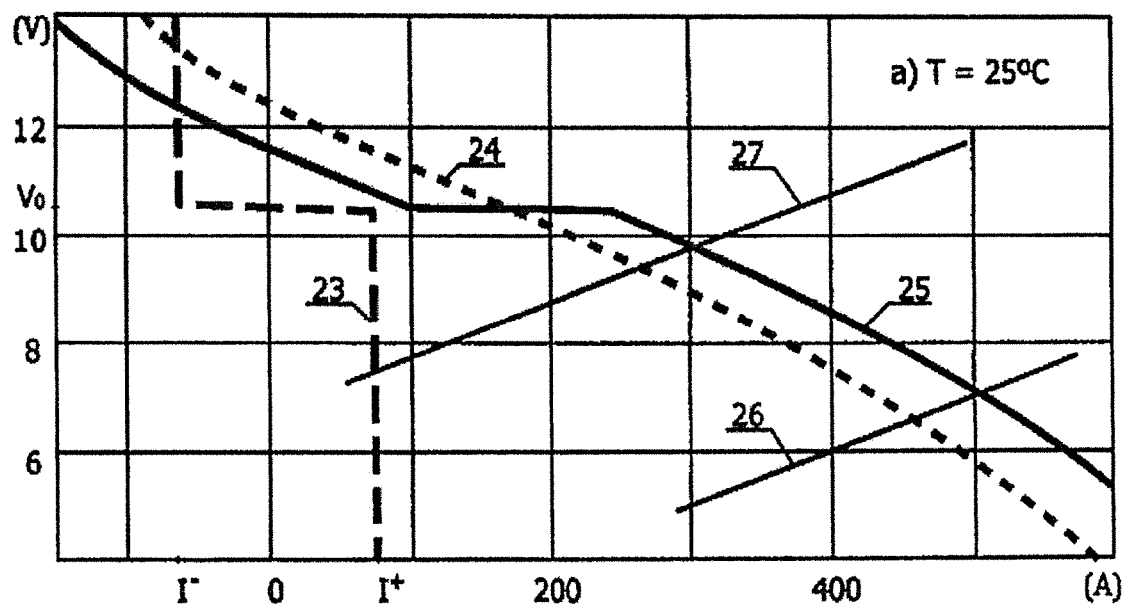
Figure 3:
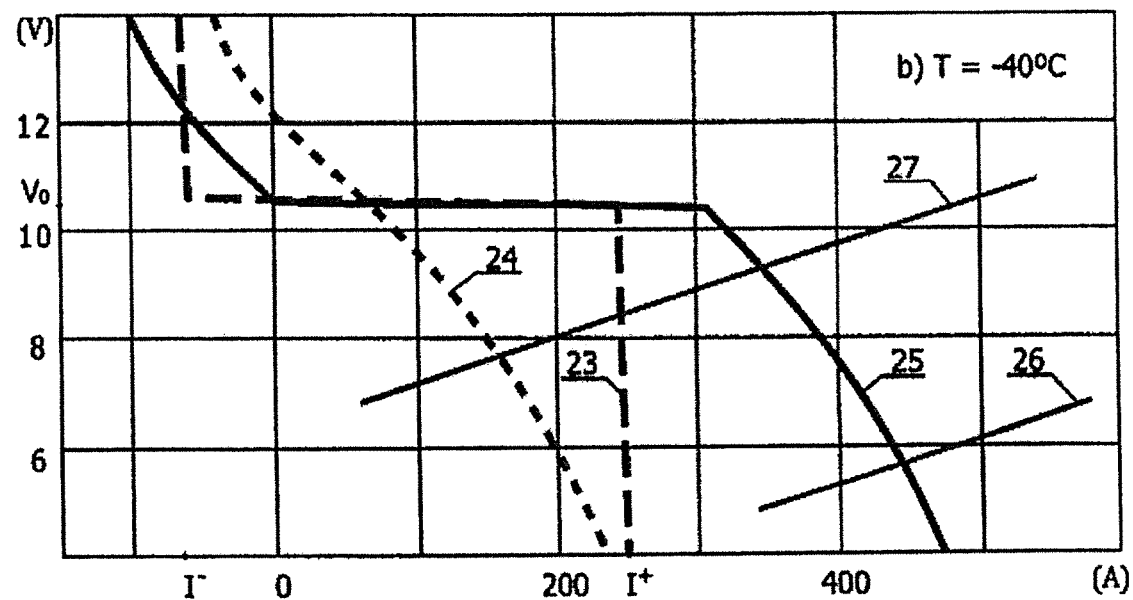

The invention is explained by drawings, which show the following:

FIG. 1—a block diagram of the system in the analog embodiment;

FIG. 2—current-voltage characteristics of the electricity supply system's components for passenger cars in normal climatic conditions;

FIG. 3—current-voltage characteristics of the electricity supply system's components for passenger cars at reduced air temperature.

The block diagram shows:

electric network 1 with negative and positive wires, to which an accumulator battery 2 and electric starter 3 are connected;

capacitor bank 4;

bidirectional converter 5, implemented between the capacitor bank 4 and electric network 1;

regulator 6 with outputs connected to control inputs 7, 8, 9 of the bidirectional converter;

input 10 of the regulator, to which a capacitor bank 4 voltage is supplied;

thermal sensor 11 connected to the additional input 12 of the regulator.

Regulator 6 contains:

first error detector 13, whose output is connected to the first control input 7 of the bidirectional converter, and the direct input is input 10 of the regulator;

second error detector 14, whose output is connected to the second control input 8 of the bidirectional converter, and the inverting input is the additional input 12 of the regulator;

source 15 of the voltage reference, which is supplied to the third control input 9 of the bidirectional converter.

Bidirectional converter 5 contains:

keys 16, 17, 18, 19, based on insulated-gate field-effect transistors;

inductor 20 with inductor's current sensor 21;

key control circuit 22.

The negative output of the capacitor bank 4 is connected to the negative wire of the electric network 1. Positive and negative outputs of the capacitor bank 4 are interconnected through the serially connected first key 16 and second key 17. Positive and negative wires of the electric network 1 are interconnected through the serially connected third key 18 and fourth key 19. The connecting point of the first and second keys is connected to the connecting point of the third and fourth keys through inductor 20 and inductor's current sensor 21. The inductor's current sensor 21 output, positive and negative wires of the electric network 1 and control inputs 7, 8, 9 of the bidirectional converter are related to the key control circuit 22, whose design principles are publicly known (see, for example: Linear Technology. 4-switch buck-boost controller LTC 3789. http://www.linear.com/product/ltc3789).

Design voltage-current characteristics of the passenger car electric power supply systems are provided for normal climatic conditions (FIG. 2) and reduced air temperature (FIG. 3):

feature 23 of the bidirectional converter at outputs on the side of the electric network;

feature 24 of the accumulator battery (12V, 40 Ah);

feature 25, obtained by summing up currents of the bidirectional converter (corresponding to features 23 and 24);

feature 26 of the electric starter at the moment of startup;

feature 27 of the electric starter in the crank mode.

When not in operation, the accumulator battery 2 is disconnected from the electric network 1, the voltage of the latter is zero, the capacitor bank 4 is discharged, the bidirectional converter 5 supply is missing, keys 16, 17, 18, and 19 are switched off.

After the accumulator battery 2 is connected to the electric network 1, its voltage v is supplied to outputs of the bidirectional converter 5. The bidirectional converter 5, commuting keys 16, 17, 18, and 19 (key control principle is known and not provided in this description) ensures current i flow between the capacitor bank 4 and electric network 1 through the inductor 20 and inductor's current sensor 21. The value of the specified current is provided by key control circuit 22 to provide voltage-current feature 23 at outputs of the bidirectional converter 5, connected to electric network 1. The current example reviews parameters I−, I+ and V0 of voltage-current feature 23 are provided by regulator 6 in the following way:

first error detector 13 increases parameter I− from −70 A to zero while increasing the voltage of the capacitor bank 4 from zero to ref V value;

second error detector 14 reduces parameter I+ from 250 to 80 A while increasing thermal sensor temperature 11 from −40° C. to ref T value;

reference voltage value 15 provides parameter V0=10.5V.

The total current of the bidirectional converter 5 and accumulator battery 2 correspond to voltage-current feature 25. If electric network 1 is not loaded, then the total current of the bidirectional converter 5 and accumulator battery 2 is zero and, in accordance with feature 25, the electric network voltage is 11.5V at normal climatic conditions (FIG. 2) or 10.5V at reduced air temperature (FIG. 3). This voltage, according to features 23 and 24, corresponds to negative current I− of the bidirectional converter 5, whose absolute value equals to the positive current of the accumulator battery 2. The specified current, flowing through the bidirectional converter 5, charges the capacitor bank 4. While charging, the capacitor bank 4 voltage increases up to ref V value, where parameter I− of the voltage-current feature 23 becomes zero, i.e. the charge of the capacitor bank 4 ends, when its voltage reaches ref V value. After that, the bidirectional converter 5 and accumulator battery 2 go into a no-load run, the electric network 1 voltage is 12÷12.5V, the system is ready for the load connection.

In the engine start mode, the claimed system works in the following way. When the electric starter 3 is connected to electric network 1, the electric starter shaft is immobile, the current and voltage is determined by the intersection point of features 25 and 26. Then, the rotating speed of the electric starter 3 shaft increases, the current and voltage are determined by the intersection point of features 25 and 27. In the reviewed example, the electric starter current changes at normal climatic conditions (FIG. 2) from 500 A to 300 A; at reduced air temperature (FIG. 3) from 450 A to 350 A.

The electric starter current consists of the currents of the bidirectional converter (feature 23) and accumulator battery (feature 24) in the following way:

at normal climatic conditions (FIG. 2), the current of the bidirectional converter is 80 A, the accumulator battery changes from 420 A to 220 A;

at reduced air temperature (FIG. 3), the current of the bidirectional converter is 250 A, the accumulator battery current changes from 200 A to 100 A.

Thus, the temperature effect is insignificant on the in-rush current of the electric starter during the ignition of the internal combustion engine. Furthermore, as temperature increases, the current of the bidirectional converter and capacitor bank is reduced, preventing their overheating. Specified technical results increase the life of the electric starter and the reliability of the electric power supply system, which ensures their operation in the "start-stop" mode (with short intervals between electric starter actuation).

For the best mutual compensation of temperature-dependent currents of the bidirectional converter and accumulator battery, preferably to have the capacitor bank, bidirectional converter, regulator and thermal sensor in the common housing, installed near the accumulator battery.

In the digital embodiment, the bidirectional converter has a digital control input, and the regulator is designed as a microprocessor devise. The system in the digital embodiment operates by the same principle as the described system in the analog embodiment and is not shown on drawings.

The invention claimed is:

1. An electricity supply system for transport vehicle, consisting of an electric network with negative and positive wires, to which an accumulator battery and electric starter are connected, a capacitor bank, a bidirectional converter, a regulator with at least one output and an input to receive voltage from the capacitor bank, said bidirectional converter has input connected to the capacitor bank, output connected to the electric network, and at least one control input connected to the output of the regulator, said at least one control input capable of changing voltage-current characteristics of said bidirectional converter, upon transmission of a signal, WHEREIN said system further comprises a thermal sensor; said regulator comprises an additional input connected to the thermal sensor; said thermal sensor being designed to decrease the maximum value of current flowing from the bidirectional converter into the electric network; and WHEREIN when said at least one control input transmits a signal to change the voltage-current characteristics of the bidirectional converter, the bidirectional converter executes said change at output connected to the electric network in accordance with the following parameters: a current regulator part i(v)=I− at voltage values v>V0, current regulator part i(v)=I+ at voltage values v<V0, voltage regulator part v(i)=V0 at current values I−<I<I+, where the bidirectional converter has first, second and third control inputs to set parameters I−, I+ and V0, respectively.

2. The system per claim 1, wherein the regulator contains the following: a first error detector, whose output is connected to a first control input of the bidirectional converter, while a direct input is a regulator input; a second error detector, whose output is connected to a second control input of the bidirectional converter, while an inverting input is an additional input of the regulator; and a reference voltage source, which is supplied to a third control input of the bidirectional converter.

3. The system per claim 1, wherein the bidirectional converter consists of: four keys based on insulated-gate field-effect transistors; an inductor; an inductor current sensor; a key control circuit whose first, second and third inputs correspond to the control inputs of the bidirectional converter; a fourth input connected to the inductor current sensor; and a fifth input which is supplied voltage from the electric network wherein a negative output of the capacitor bank connects to a negative wire of the electric network; positive and negative outputs of the capacitor bank interconnect through serially connected first and second keys; positive and negative wires of the electric network interconnect through third and fourth keys; and a connecting point of said first and second keys and a connecting point of said third and fourth keys connect through the inductor and the inductor current sensor.

4. The system per claim 1, wherein the capacitor bank, bidirectional converter, regulator and thermal sensor placed jointly a in series.

\* \* \* \* \*